(12) United States Patent
Boecking et al.

(10) Patent No.: US 9,404,460 B2
(45) Date of Patent: Aug. 2, 2016

(54) INJECTION NOZZLE

(71) Applicant: Daimler AG, Stuttgart (DE)

(72) Inventors: Tobias Boecking, Stuttgart (DE);
Harald Echtle, Gengenbach (DE);
Thorsten Hergemoeller, Kernen (DE);
Lothar Herrmann, Schwaebisch Hall (DE); Klaus Roessler, Stuttgart (DE)

(73) Assignee: Daimler AG, Stuttgart (DE)

( * ) Notice: Subject to any disclaimer, the term of this patent is extended or adjusted under 35 U.S.C. 154(b) by 117 days.

(21) Appl. No.: 14/357,398

(22) PCT Filed: Nov. 9, 2012

(86) PCT No.: PCT/EP2012/004653
§ 371 (c)(1),
(2) Date: May 9, 2014

(87) PCT Pub. No.: WO2013/068121
PCT Pub. Date: May 16, 2013

(65) Prior Publication Data
US 2014/0251261 A1    Sep. 11, 2014

(30) Foreign Application Priority Data
Nov. 10, 2011   (DE) .......................... 10 2011 118 299

(51) Int. Cl.
*F02B 3/00*       (2006.01)
*F02M 61/18*      (2006.01)
(Continued)

(52) U.S. Cl.
CPC ....... *F02M 61/1806* (2013.01); *F02M 61/1813* (2013.01); *F02M 61/1833* (2013.01);
(Continued)

(58) Field of Classification Search
CPC .. F02B 3/06; F02B 2075/125; F02B 2275/14; F02B 1/12; F02B 23/104

USPC .......................................................... 123/294
See application file for complete search history.

(56) References Cited

U.S. PATENT DOCUMENTS 3,020,899 A *  2/1962  Mueller .............. F02B 23/0657
                                                   123/188.14
7,017,840 B2   3/2006  Krueger et al.
(Continued)

FOREIGN PATENT DOCUMENTS

CN       1811160 A     8/2006
DE       39 20 315 A1  1/1990
(Continued)

OTHER PUBLICATIONS

Partial English translation of Japanese Office Action dated Jun. 2, 2015 (one page).
(Continued)

*Primary Examiner* — Lindsay Low
*Assistant Examiner* — Charles Brauch
(74) *Attorney, Agent, or Firm* — Crowell & Moring LLP

(57) ABSTRACT

An injection nozzle for the direct injection of a liquid fuel into a cylinder chamber of a piston engine includes multiple spray holes for generating injection jets. The multiple spray holes are distributed on a nozzle body of the injection nozzle in the peripheral direction. At least one pair of spray holes adjoining in the peripheral direction is provided, the longitudinal center axes of which enclose a pair angle in the peripheral direction that is smaller than an adjacent angle which is enclosed between the longitudinal center axis of the respective spray hole of the spray hole pair in the peripheral direction and a longitudinal center axis of a spray hole adjoining the spray hole pair in the peripheral direction.

12 Claims, 3 Drawing Sheets

Figure 1:
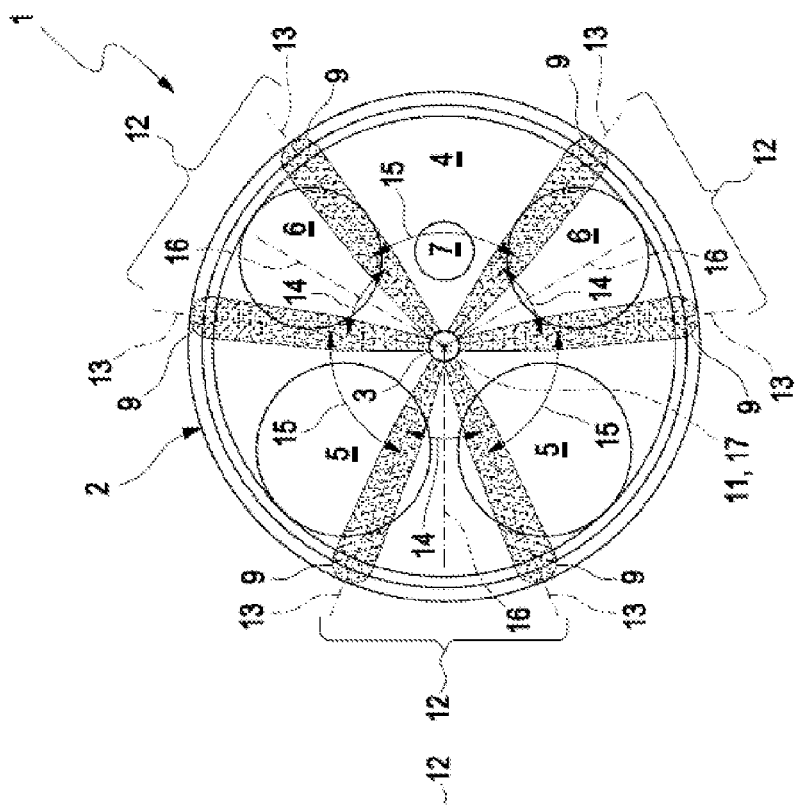

(51) Int. Cl.
  *F02B 23/10* (2006.01)
  *F02B 1/12* (2006.01)
  *F02B 3/06* (2006.01)
  *F02B 75/12* (2006.01)

(52) U.S. Cl.
  CPC ... *F02B 1/12* (2013.01); *F02B 3/06* (2013.01); *F02B 23/104* (2013.01); *F02B 2075/125* (2013.01); *F02B 2275/14* (2013.01)

(56) References Cited

U.S. PATENT DOCUMENTS

| | | | |
|---|---|---|---|
| 7,121,480 | B2 | 10/2006 | Pontoppidan |
| 7,770,556 | B2 | 8/2010 | Kihara et al. |
| 2004/0099754 | A1* | 5/2004 | Dantes ............... F02M 51/0671 239/585.4 |
| 2005/0252483 | A1 | 11/2005 | Ganz et al. |
| 2009/0025680 | A1 | 1/2009 | Kihara et al. |
| 2009/0045269 | A1 | 2/2009 | Shimo et al. |
| 2010/0237174 | A1 | 9/2010 | Oomori et al. |
| 2010/0320293 | A1 | 12/2010 | Ogura et al. |
| 2013/0181068 | A1 | 7/2013 | Dantes et al. |

FOREIGN PATENT DOCUMENTS

| | | |
|---|---|---|
| DE | 198 38 771 A1 | 3/2000 |
| DE | 102 46 693 A1 | 4/2004 |
| DE | 10 2006 037 413 B4 | 5/2008 |
| DE | 10 2008 036 840 A1 | 2/2010 |
| DE | 10 2009 046 001 A1 | 4/2010 |
| DE | 10 2010 031 653 A1 | 1/2012 |
| DE | 10 2011 016 234 A1 | 10/2012 |
| EP | 1 775 439 A1 | 4/2007 |
| JP | 2003-161230 A | 6/2003 |
| JP | 2005-98120 A | 4/2005 |
| JP | 2006-510843 A | 3/2006 |
| JP | 2007-132231 A | 5/2007 |
| JP | 2009-24683 A | 2/2009 |
| JP | 2010-249125 A | 11/2010 |
| WO | WO 2004/059153 A1 | 7/2004 |
| WO | WO 2012/010356 A1 | 1/2012 |

OTHER PUBLICATIONS

International Search Report (PCT/ISA/220 & PCT/ISA/210) dated Jan. 18, 2013 with English translation (8 pages).
German-language Written Opinion (PCT/ISA/237) dated Jan. 18, 2013 (8 pages).
Chinese Office Action issued in Chinese counterpart application No. 201280054399.0 dated Sep. 6, 2015, with partial English translation (Twelve (12) pages).

* cited by examiner

INJECTION NOZZLE

BACKGROUND AND SUMMARY OF THE INVENTION

Exemplary embodiments of the present invention relate to an injection nozzle for the direct injection of a liquid fuel into a cylinder chamber of a piston engine, a piston engine that is equipped with at least one injection nozzle of this type, and a method for the direct injection of a liquid fuel into a cylinder chamber of a piston engine.

German patent document DE 10 2006 037 413 B4 discloses an injection nozzle that includes multiple spray holes for generating injection jets that extend in a star-shaped pattern, the spray holes being distributed on a nozzle body of the injection nozzle in the peripheral direction. This injection nozzle has six spray holes, which are divided into two groups of three spray holes each. The two groups of spray holes are diametrically opposed. Within the particular group of spray holes, the spray holes adjoining in the peripheral direction enclose essentially the same angle between their longitudinal center axes. This injection nozzle is positioned in the associated cylinder in a targeted manner in such a way that one group of spray holes is associated with two intake valves, while the other group of spray holes is associated with two exhaust valves.

To able to achieve efficient, low-emission combustion in gasoline engines, i.e., spark-ignition piston engines, which operate with formation of an internal mixture, i.e., with direct injection, the fuel must be optimally distributed in the combustion chamber during homogeneous operation. In the process, combustion chamber walls, i.e., a cylinder wall, a top side of the piston facing the cylinder chamber, and a bottom side of the cylinder head facing the cylinder chamber, and the gas exchange valves must be prevented from becoming wetted with liquid fuel, which would result in increased pollutant emissions. This problem is compounded the smaller the size of the available cylinder chambers, since the free propagation paths that are available for the injection jets are correspondingly reduced on account of the reduced displacement. However, engines with increasingly smaller displacements are being sought for reduction of the fuel consumption.

Exemplary embodiments of the present invention are directed to an improved design for an injection nozzle and for a piston engine and for an injection process, which reduces the risk of wetting of combustion chamber walls with liquid fuel.

The invention is based on the general concept of producing an interaction, between two injection jets adjoining in the peripheral direction, which influences the jet propagation direction and thus reduces the penetration depth of the injection jets. The particular interaction results in a deviation of the interacting two injection jets from one another. The invention is based on the finding that this type of interaction with a deviation occurs between two injection jets adjoining in the peripheral direction when the two injection jets are situated at a comparatively small distance from one another in the peripheral direction. The distance from adjacent injection jets may be defined by the angle enclosed by the longitudinal center axes of the two injection jets or enclosed by the longitudinal center axes of the two associated spray holes. The invention makes use of the finding that an individual injection jet interacts with the fresh air enveloping it, such that the fresh air compresses the particular injection jet transversely with respect to its direction of propagation, toward the center of the injection jet, and counteracts an expansion of the injection jet transversely with respect to its direction of propagation. However, if two injection jets are situated relatively close together, only a comparatively small amount of fresh air is present between these two injection jets, so that the above-described interaction with the fresh air is greatly reduced at that location, i.e., at the mutually facing inner sides of the injection jets. As a result, the two injection jets may converge more intensely toward one another. At the same, effective interactions with the fresh air now predominate at the outer sides of the injection jets facing away from one another, so that these divert the two injection jets away from one another. This ultimately results in the desired deviation of the injection jets that are comparatively close to one another.

It is clear that not just the angular distance of the adjacent injection jets is crucial for the desired interaction with deviation of the injection jets. However, this is one of the important parameters. Other parameters influencing the interaction of the adjacent injection jets include, for example, the spray hole length, pressure conditions within the injection nozzle, and the flow pattern of the fuel within the injection nozzle for the particular spray hole.

Furthermore, for achieving the desired interaction with deviation, it is extremely important that within the injection jets at least one pair, composed of exactly two injection jets, is formed, the pair of injection jets adjoining one another in the peripheral direction, and having a distance from one another that is less than the distance of one of the injection jets of the jet pair from another injection jet that is not part of the same jet pair. In other words, the two injection jets associated with the particular jet pair are situated at a comparatively small distance from the associated injection jet of the same jet pair in one direction, while in the other direction, the two injection jets are situated at a greater distance from another injection jet that is adjacent to the jet pair. This ensures that the effective interactions with the fresh air at the outer sides of the two injection jets of the particular jet pair are sufficient to divert the two injection jets away from one another.

For the injection nozzle, this means that at least one pair of spray holes adjoins one another in the peripheral direction, the longitudinal center axes of which enclose a pair angle in the peripheral direction that is smaller than an adjacent angle which is enclosed in the peripheral direction between the longitudinal center axis of each spray hole of the spray hole pair and a longitudinal center axis of a spray hole adjoining the spray hole pair in the peripheral direction.

It has proven to be advantageous to select the respective pair angle to be 50° maximum. The pair angle may be approximately 45°. In contrast, the respective adjacent angle may be 60° minimum. Adjacent angles are preferably approximately 70° or 80°. It is clear that the pair angles and the adjacent angles are basically a function of the number of injection jets or the number of spray holes. The preferred number of spray holes is 5 to 7.

According to another advantageous embodiment, exactly six spray holes may be provided. For six spray holes, exactly two pairs of spray holes may advantageously be provided which are diametrically opposed, a further spray hole being situated in each case between the two pairs of spray holes in the peripheral direction. These two further spray holes are advantageously diametrically opposed. By means of such a configuration it is possible, for example, to associate the two pairs of spray holes with intake valves and exhaust valves in order to achieve reduced penetration depths for the injection jets in the area of the gas exchange valves in a targeted manner. In addition, favorable mixture formations may thus be achieved in the area of an ignition device, provided that one of the pairs of spray holes is associated with the ignition device. A favorable mixture formation improves stratified charge, ignition injection, and catalytic converter heating. At the same time, wetting of the intake valves with fuel may be avoided by aligning the one pair of spray holes with the intake valves.

According to an alternative embodiment in which six spray holes are likewise provided, three pairs of spray holes may be formed which are advantageously uniformly distributed in the peripheral direction, i.e., separated by a distance of approximately 120° with respect to their center axes. The penetration depth for all injection jets may be reduced in such a configuration, so that intake valve wetting may be avoided. In addition, in such configurations a favorable mixture formation may be set in the area of an ignition device. A favorable mixture formation improves stratified charge, ignition injection, and catalytic converter heating.

According to another advantageous embodiment, a supply path leading to the spray holes may be formed in the nozzle body, whereby during an injection process, the fuel flows in this supply path in an inflow direction, which in the area of the particular spray hole in the supply path, is inclined by a range of 60° to 90° with respect to the longitudinal center axis of the particular spray hole. As a result of this measure, an intensive flow deflection is achieved within the nozzle body immediately before the fuel enters into the particular spray hole, which facilitates a reduction in the penetration depth.

According to another embodiment, the particular spray hole may have a hole length and a hole diameter measured coaxially with respect to the longitudinal center axis of the spray hole, a ratio of the hole length to the hole diameter being in a range of 0.5 to 4.0. It has been shown that such ratios of the hole length to the hole diameter facilitate a reduction in the penetration depth.

For example, a hole length may be in a range of 80 μm to 300 μm. Values of 80 μm to 160 μm have proven advantageous for the hole diameter.

The prevailing pressures in the fuel for the injection process may be, for example, in a range of 10 MPa to 25 MPa, i.e., in a range of 100 bar to 250 bar.

In another advantageous embodiment, the particular spray hole may have, in its longitudinal direction, an interior jet formation section and an exterior exit section. The jet formation section defines the hole length and the hole diameter of the spray hole. The exit section has a diameter that is larger than the hole diameter of the jet formation section. The length of the exit section may be essentially equal to the length of the jet formation section. This stepped configuration of the particular spray hole facilitates the generation of injection jets having a small penetration depth.

A piston engine according to the invention includes at least one cylinder and at least one injection nozzle of the above-described type per cylinder, whereby direct injection of liquid fuel into a cylinder chamber of the particular cylinder may be carried out by means of the respective injection nozzle. The injection nozzle is situated in the area of a longitudinal center axis of the cylinder, while an ignition device of the particular cylinder is situated at a distance from the injection nozzle. The particular injection nozzle may now be oriented with respect to its spray holes in such a way that that the ignition device is situated between the two injection jets of such a pair of spray holes in the peripheral direction or between two pairs of spray holes adjoining in the peripheral direction.

A longitudinal center axis of the injection nozzle may extend parallel to the longitudinal center axis of the cylinder. It is likewise possible to provide an inclination, which, however, is preferably less than 20° or equal to 20°, between the longitudinal center axis of the injection nozzle and the longitudinal center axis of the cylinder.

In one advantageous refinement, the ignition device may be situated between two exhaust valves of the particular cylinder in the peripheral direction. Additionally or alternatively, the injection nozzle may be oriented with respect to its spray holes in such a way that the injection jets of such a pair of spray holes extend between two intake valves of the particular cylinder in the peripheral direction. As a result of this orientation, the risk of wetting of the intake valves is significantly reduced.

Further important features and advantages of the invention result from the drawings, and the associated description of the figures with reference to the drawings.

It is understood that the features stated above and to be explained below may be used not only in the particular stated combination, but also in other combinations or alone without departing from the scope of the present invention.

BRIEF DESCRIPTION OF THE DRAWING FIGURES

Preferred exemplary embodiments of the invention are illustrated in the drawings and explained in greater detail in the following description. Identical, similar, or functionally equivalent components are denoted by the same reference numerals.

Figure 2:
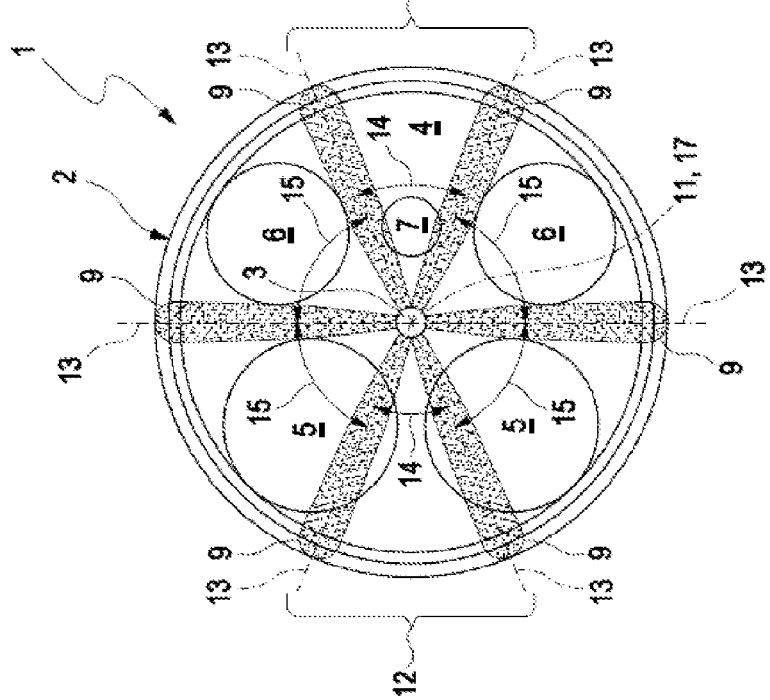
Figure 3:
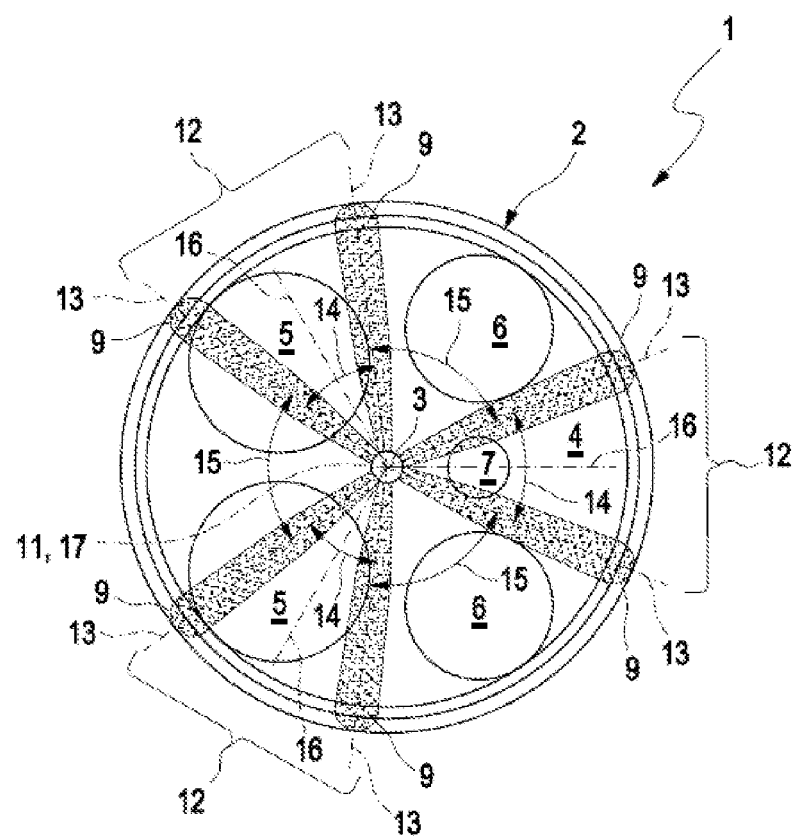
Figure 5:
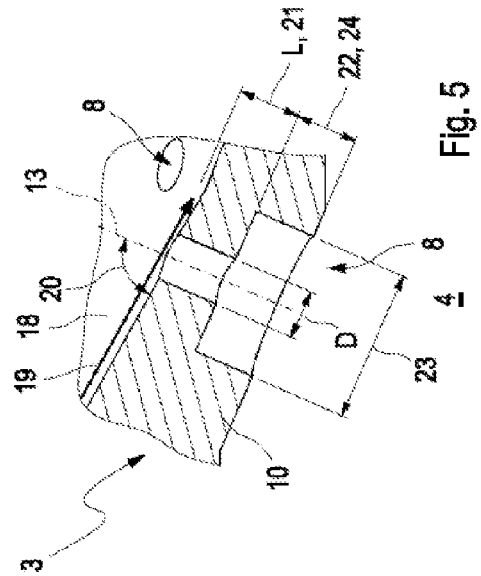
Figure 6:
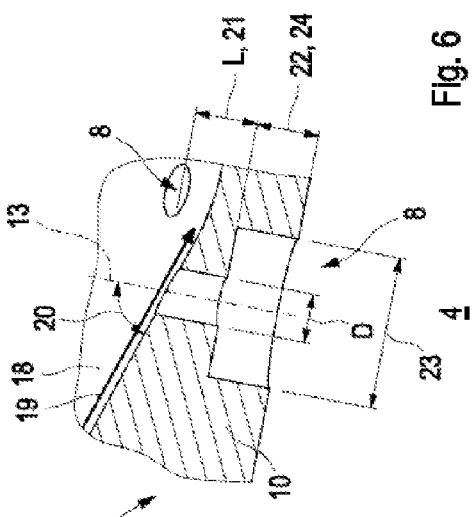
Figure 4:
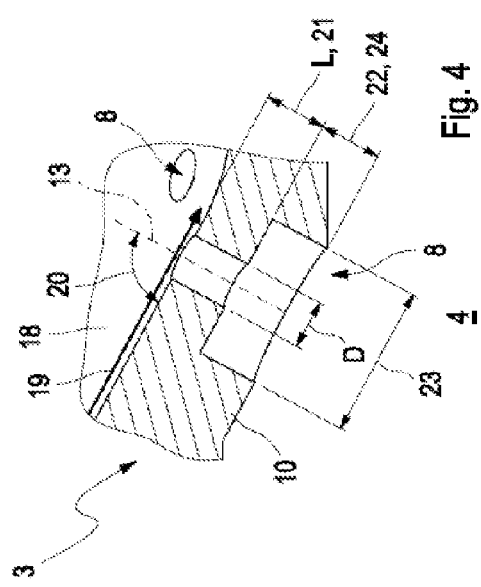

The drawings show the following, in each case in a schematic manner:

FIGS. 1 through 3 in each case show a greatly simplified cross section of a cylinder of a piston engine during an injection process, in various embodiments; and FIGS. 4 through 6 in each case show a greatly simplified longitudinal section of an injection nozzle in the area of a spray hole, in various embodiments.

DETAILED DESCRIPTION

According to FIGS. 1 through 3, a piston engine 1 includes at least one cylinder 2 and one injection nozzle 3 per cylinder 2. A liquid fuel may be injected directly into a cylinder chamber 4 of the particular cylinder 2 by means of the injection nozzle 3. In addition, gas exchange valves 5, 6, namely, two intake valves 5 and two exhaust valves 6 in the example, are associated with the particular cylinder 2. Furthermore, an ignition device 7, for example a spark plug, is provided for each cylinder 2, so that the piston engine 1 is a spark-ignition piston engine 1, i.e., a gasoline engine.

According to FIGS. 1 through 6, the particular injection nozzle 3 includes multiple spray holes 8, apparent in FIGS. 4 through 6, which during an injection process generate multiple injection jets 9 shown in FIGS. 1 through 3. In the preferred examples in FIGS. 1 through 3, exactly six spray holes 8 are provided for generating six jets 9. Embodiments having five to seven spray holes 8 are preferred. Other numbers of holes are likewise conceivable in principle.

The spray holes 8 are distributed on a nozzle body 10 of the injection nozzle 3 in the peripheral direction of the injection nozzle 3 in such a way that a star-shaped configuration of the injection jets 9 results during the injection process. The peripheral direction refers to a longitudinal center axis 11 of the injection nozzle 3, which in FIGS. 1 through 3 is perpendicular to the plane of the drawing.

The arrangement or distribution of the spray holes 8 in the peripheral direction is selected in such a way that at least one pair 12 of two spray holes 8 adjoining in the peripheral direction or of injection jets 9 adjoining in the peripheral direction results, as denoted by curly brackets in FIGS. 1 through 3. The two spray holes 8 or the two injection jets 9 of the respective jet pair 12 or of the respective spray hole pair 12 have longitudinal center axes 13 enclosing a pair angle 14 in the peripheral direction. In addition, an adjacent angle 15 is enclosed between the longitudinal center axis 13 of the respective spray hole 8 of the respective spray hole pair 12 or of the respective injection jet 9 of the respective jet pair 12, and a longitudinal center axis 13 of a spray hole 8 or injection jet 9 adjoining the particular spray hole pair 12 or jet pair 12 in the peripheral direction. The pair angles 14 in each case are smaller than the adjacent angles 15. For example, for the pair angles 14, angular values up to 50° maximum are preferred, while for the adjacent angles 15, angular values of at least 60° are preferred. In the examples shown, the pair angle 14 in each case is approximately 45°, while the adjacent angle 15 in each case is approximately 80°.

The particular spray hole pair 12 or jet pair 12 is characterized in that the pair angle 14 of the two longitudinal center axes 13 of the jet pair 12 is smaller than the two adjacent angles 15 adjoining in one peripheral direction and in the other peripheral direction.

In the example in FIG. 1, exactly two spray hole pairs 12 are provided which are diametrically opposed. Thus, in each case a further spray hole 8 is situated between the two spray hole pairs 12 in the peripheral direction, the further spray holes being diametrically opposed. A corresponding configuration results for the associated injection jets 9.

In contrast, FIGS. 2 and 3 show embodiments with exactly three spray hole pairs 12, which are advantageously uniformly distributed in the peripheral direction. Accordingly, center axes 16, which within the particular spray hole pair 12 extend centrally between the longitudinal center axes 13 of the spray holes 8 of the particular spray hole pair 12, are offset by 120° with respect to one another in the peripheral direction.

The ignition device 7 is situated between the two exhaust valves 6 in the embodiments in FIGS. 1 through 3. In addition, the ignition device 7 is positioned eccentrically in the cylinder chamber 4, i.e., at a radial distance with respect to a longitudinal center axis 17 of the cylinder 2. In contrast, the injection nozzle 3 is situated centrally in the cylinder 2, i.e., in the area of the longitudinal center axis 17 of the cylinder 2. In the embodiments shown here, the positioning or orientation of the injection nozzle 3 is such that the ignition device 7 is situated approximately centrally between the two injection jets 9 of a spray hole pair 12 in the peripheral direction (FIGS. 1 and 3), or between two spray hole pairs 12 adjoining in the peripheral direction (FIG. 2). In the embodiments in FIGS. 1 and 3, the orientation of the injection nozzle 3 is also such that a spray hole pair 12 extends between the exhaust valves 6 in the peripheral direction. In the embodiments in FIGS. 1 and 2, the configuration is such that one of the spray hole pairs 12 extends between the intake valves 5 in the peripheral direction.

The injection nozzle 3 may advantageously be situated coaxially with respect to the cylinder 2, so that the longitudinal center axis 11 of the injection nozzle 3 coincides with the longitudinal center axis 17 of the cylinder 2. However, an inclination between the longitudinal center axes 11, 17 of the injection nozzle 3 and the cylinder 2, respectively, is conceivable in principle, but should not exceed 20°.

According to FIGS. 4 through 6, a supply path 18 leading to the spray holes 8 may be formed in the nozzle body 10. During an injection process, the fuel flows in the supply path 18 in an inflow direction 19, which is indicated by an arrow in FIGS. 4 through 6. In the area of the particular spray hole 8, this inflow direction 19 is inclined in the supply path 18, i.e., with respect to the longitudinal center axis 13 of the particular spray hole 8 at a side facing away from the cylinder chamber 4, in particular preferably in an angular range of 60° to 90°. FIG. 4 shows an example in which an angle of inclination 20 between the inflow direction 19 and the longitudinal center axis 13 is approximately 90°. The angle of inclination is approximately 80° in FIG. 5. The angle of inclination is approximately 70° in FIG. 6.

According to FIGS. 4 through 6, the particular spray hole 8 has a hole length L and a hole diameter D that are measured coaxially with respect to the longitudinal center axis 13 of the spray hole 8. In the example, the hole length L is larger than the hole diameter D. Advantageous ratios of the hole length L to the hole diameter D are in a range of 0.5 to 4.0.

In the examples shown, the particular spray hole 8 has, in its longitudinal direction, an interior jet formation section 21 and an exterior exit section 22. The jet formation section 21 defines the hole length L and the hole diameter D. The exit section 22 has a diameter 23 which is much larger than the hole diameter D. In the example, the exit section has a length 24 which is approximately equal to the hole length L.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An injection nozzle configured for direct injection of a liquid fuel into a cylinder chamber of a spark-ignited piston engine, the injection nozzle comprising:
   a nozzle body; and
   multiple spray holes, each configured for generating injection jets, wherein the multiple spray holes are arranged in a star-shaped pattern and are distributed on the nozzle body in a peripheral direction,
   wherein at least one pair of spray holes of the multiple spray holes, which are adjoining in the peripheral direction, have longitudinal center axes enclosing a pair angle in the peripheral direction, wherein the pair angle is smaller than an adjacent angle enclosed between the longitudinal center axis of one of the spray holes of the at least spray hole pair in the peripheral direction and a longitudinal center axis of a spray hole of an adjoining the spray hole pair in the peripheral direction,
   wherein the multiple spray holes include exactly six spray holes,
   wherein the multiple spray holes include exactly two spray hole pairs that are diametrically opposed;
   wherein a further spray hole is situated, in the peripheral direction, between each of the at least one pair of spray holes,
   wherein the injection nozzle is situated in an area of a longitudinal center axis of a cylinder of the cylinder chamber,
   wherein an ignition device of the cylinder is situated at a distance from the injection nozzle,
   wherein the injection nozzle is oriented with respect to the multiple spray holes in such a way that the ignition device is situated, in the peripheral direction, between the two injection jets of the at least one pair of spray holes, and
   wherein the ignition device is situated, in the peripheral direction, between two exhaust valves of the cylinder.

2. The injection nozzle of claim 1, wherein the pair angle is no greater than 50° and the adjacent angle is at least 60°.

3. The injection nozzle of claim 1, further comprising:
a supply path, which leads to the multiple spray holes, is formed in the nozzle body, wherein during an injection process, the fuel flows in the supply path in an inflow direction, wherein the supply path, in an area of one of the multiple spray holes, is inclined by a range of 60° to 90° with respect to the longitudinal center axis of the one of the multiple spray holes.

4. The injection nozzle of claim 1, wherein one of the multiple spray holes has a hole length and a hole diameter, wherein a ratio of the hole length to the hole diameter being in a range of 0.5 to 4.0.

5. An injection nozzle configured for the direct injection of a liquid fuel into a cylinder chamber of a spark-ignited piston engine, the injection nozzle comprising:
a nozzle body; and
multiple spray holes, each configured for generating injection jets, wherein the multiple spray holes are arranged in a star-shaped pattern and are distributed on the nozzle body in a peripheral direction,
wherein at least one pair of spray holes of the multiple spray holes, which are adjoining in the peripheral direction, have longitudinal center axes enclosing a pair angle in the peripheral direction, wherein the pair angle is smaller than an adjacent angle enclosed between the longitudinal center axis of one of the spray holes of the at least spray hole pair in the peripheral direction and a longitudinal center axis of a spray hole of an adjoining the spray hole pair in the peripheral direction,
wherein the multiple spray holes include exactly six spray holes;
wherein the at least one pair of spray holes includes exactly three spray hole pairs,
wherein the three spray hole pairs are uniformly distributed in the peripheral direction,
wherein the injection nozzle is situated in an area of a longitudinal center axis of a cylinder of the cylinder chamber,
wherein an ignition device of the cylinder is situated at a distance from the injection nozzle,
wherein the injection nozzle is oriented with respect to the multiple spray holes in such a way that the ignition device is situated, in the peripheral direction, between the two injection jets of one of the multiple spray hole pairs or between two spray hole pairs of the multiple spray hole pairs adjoining in the peripheral direction, and
wherein the ignition device is situated, in the peripheral direction, between two exhaust valves of the particular cylinder.

6. The injection nozzle of claim 5, wherein the pair angle is no greater than 50° and the adjacent angle is at least 60°.

7. The injection nozzle of claim 5, further comprising:
a supply path, which leads to the multiple spray holes, is formed in the nozzle body, wherein during an injection process, the fuel flows in the supply path in an inflow direction, wherein the supply path, in an area of one of the multiple spray holes, is inclined by a range of 60° to 90° with respect to the longitudinal center axis of the one of the multiple spray holes.

8. The injection nozzle of claim 5, wherein one of the multiple spray holes has a hole length and a hole diameter, wherein a ratio of the hole length to the hole diameter being in a range of 0.5 to 4.0.

9. A piston engine, comprising:
a plurality of cylinders, each having a cylinder chamber; and
one injection nozzle for each of the plurality of cylinders, wherein the one injection nozzle is configured for a direct injection of liquid fuel into one of the cylinder chamber of one of the cylinders, wherein the one injection nozzle for each of the plurality of cylinders comprises
a nozzle body; and
multiple spray holes, each configured for generating injection jets, wherein the multiple spray holes are arranged in a star-shaped pattern and are distributed on the nozzle body in a peripheral direction,
wherein at least one pair of spray holes of the multiple spray holes, which are adjoining in the peripheral direction, have longitudinal center axes enclosing a pair angle in the peripheral direction, wherein the pair angle is smaller than an adjacent angle enclosed between the longitudinal center axis of one of the spray holes of the at least spray hole pair in the peripheral direction and a longitudinal center axis of a spray hole of an adjoining the spray hole pair in the peripheral direction,
wherein the multiple spray holes include exactly six spray holes,
wherein the multiple spray holes include exactly two spray hole pairs that are diametrically opposed;
wherein a further spray hole is situated, in the peripheral direction, between each of the at least one pair of spray holes,
wherein the injection nozzle is situated in an area of a longitudinal center axis of the cylinder of the cylinder chamber,
wherein an ignition device of the cylinder is situated at a distance from the injection nozzle,
wherein the injection nozzle is oriented with respect to the multiple spray holes in such a way that the ignition device is situated, in the peripheral direction, between the two injection jets of the at least one pair of spray holes,
wherein the ignition device is situated, in the peripheral direction, between two exhaust valves of the cylinder, and
wherein the one injection nozzle for each of the plurality of cylinders is oriented with respect to its spray holes in such a way that the injection jets of one of the spray hole pairs extend, in the peripheral direction, between two intake valves of the cylinder in the peripheral direction.

10. The piston engine of claim 9, wherein the pair angle is no greater than 50° and the adjacent angle is at least 60°.

11. The piston engine of claim 9, wherein the one nozzle for each of the plurality of cylinders further comprises:
a supply path, which leads to the multiple spray holes, is formed in the nozzle body, wherein during an injection process, the fuel flows in the supply path in an inflow direction, wherein the supply path, in an area of one of the multiple spray holes, is inclined by a range of 60° to 90° with respect to the longitudinal center axis of the one of the multiple spray holes.

12. The piston engine of claim 9, wherein one of the multiple spray holes has a hole length and a hole diameter, wherein a ratio of the hole length to the hole diameter being in a range of 0.5 to 4.0.

* * * * *